United States Patent
Enomoto (10) Patent No.: US 6,429,979 B2
(45) Date of Patent: Aug. 6, 2002

(54) ZOOM LENS SYSTEM

(75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/791,771

(22) Filed: Feb. 26, 2001

(30) Foreign Application Priority Data

Feb. 24, 2000 (JP) ........................................ 2000-047619

(51) Int. Cl.⁷ .............................................. G02B 15/14
(52) U.S. Cl. ........................ 359/692; 359/689; 359/683; 359/684
(58) Field of Search ................................ 359/689–692, 359/683, 684

(56) References Cited

U.S. PATENT DOCUMENTS

| | | | |
|---|---|---|---|
| 4,917,482 A | 4/1990 | Ito | 359/690 |
| 4,984,877 A | 1/1991 | Ito | 359/692 |
| 5,572,276 A | 11/1996 | Hirakawa | 359/684 |
| 5,777,800 A * | 7/1998 | Yamaguchi et al. | 359/689 |
| 5,930,052 A * | 7/1999 | Enomoto et al. | 359/689 |
| 5,956,186 A * | 9/1999 | Hagimori | 359/684 |
| 6,028,714 A | 2/2000 | Koyama | 359/683 |
| 6,181,484 B1 * | 1/2001 | Sato | 359/692 |
| 6,185,050 B1 * | 2/2001 | Ota et al. | 359/687 |
| 6,236,518 B1 * | 5/2001 | Enomoto | 359/692 |
| 6,268,965 B1 * | 7/2001 | Enomoto | 359/686 |
| 6,324,017 B1 * | 11/2001 | Enomoto | 359/680 |
| 6,333,824 B1 * | 12/2001 | Morooka | 359/692 |
| 6,353,507 B1 * | 3/2002 | Enomoto | 359/680 |
| 6,369,955 B1 * | 4/2002 | Enomoto | 359/685 |

FOREIGN PATENT DOCUMENTS

JP 8-146296 6/1996

* cited by examiner

Primary Examiner—Evelyn A Lester
(74) Attorney, Agent, or Firm—Greenblum & Bernstein, P.L.C.

(57) ABSTRACT

A zoom lens system includes a positive first lens group and a negative second lens group. In a short-focal-length side zooming, the first and second lens groups are moved towards the object, while the moveable sub-lens group is stationary at the object-side end. At the intermediate switching focal length, the moveable sub-lens group is moved to the image-side end, and the first and second lens groups are moved towards the image plane. In a long-focal-length side zooming range, the first and second lens groups are moved towards the object, while the moveable sub-lens group is stationary at the image-side end. Moreover, the zoom lens system satisfies $0.3 < \log Z_i / \log Z < 0.8$ ... (1); wherein $Z_i = f_m / f_w$; $Z = f_t / f_w$; $f_w$ designates the focal length at the short focal length extremity; $f_t$ designates the focal length at the long focal length extremity; and $f_m$ designates the intermediate switching focal length.

2 Claims, 13 Drawing Sheets

——— d Line
------- g Line
– – – C Line

-1.0   1.0
SPHERICAL
ABERRATION

CHROMATIC
ABERRATION

Fig.2B
W=36.7°

-0.05   0.05
LATERAL
CHROMATIC
ABERRATION

-1.0   1.0
ASTIGMATISM

Fig.2D
W=36.7°

-5.0 (%) 5.0
DISTORTION

—— d Line
----- g Line
— - — C Line

-1.0   1.0
SPHERICAL
ABERRATION

CHROMATIC
ABERRATION

Fig.4B
W=10.9°

-0.05   0.05
LATERAL
CHROMATIC
ABERRATION

-1.0   1.0
ASTIGMATISM

Fig.4D
W=10.9°

-5.0 (%) 5.0
DISTORTION

——— d Line
- - - - - g Line
— — — C Line

-1.0  1.0
SPHERICAL
ABERRATION

CHROMATIC
ABERRATION

Fig.6B
W=23.6°

-0.05  0.05
LATERAL
CHROMATIC
ABERRATION

-1.0  1.0
ASTIGMATISM

Fig.6D
W=23.6°

-5.0 (%) 5.0
DISTORTION

—— d Line
----- g Line
--- C Line

-1.0   1.0
SPHERICAL
ABERRATION

CHROMATIC
ABERRATION

Fig. 8B
$W=22.6°$

-0.05   0.05
LATERAL
CHROMATIC
ABERRATION

-1.0   1.0
ASTIGMATISM

Fig. 8D
$W=22.6°$

-5.0 (%) 5.0
DISTORTION

—— d Line
------- g Line
-- -- C Line

-1.0  1.0
SPHERICAL
ABERRATION

CHROMATIC
ABERRATION

Fig.10B
W=20.0°

-0.05  0.05
LATERAL
CHROMATIC
ABERRATION

-1.0  1.0
ASTIGMATISM

Fig.10D
W=20.0°

-5.0 (%) 5.0
DISTORTION

—— d Line
------ g Line
—-— C Line

-1.0  1.0
SPHERICAL
ABERRATION

CHROMATIC
ABERRATION

Fig. 12B
W=19.4°

-0.05  0.05
LATERAL
CHROMATIC
ABERRATION

-1.0  1.0
ASTIGMATISM

Fig. 12D
W=19.4°

-5.0 (%) 5.0
DISTORTION

Fig. 13

Fig. 14A 
$F_{NO}=9.5$
— d Line
······ g Line
– – C Line
-1.0   1.0
SPHERICAL
ABERRATION

CHROMATIC
ABERRATION

Fig. 14B 
W=17.3°
-0.05   0.05
LATERAL
CHROMATIC
ABERRATION

Fig. 14C 
W=17.3°
— S
– – M
-1.0   1.0
ASTIGMATISM

Fig. 14D 
W=17.3°
-5.0 (%) 5.0
DISTORTION

— d Line
---- g Line
--- C Line

-1.0   1.0
SPHERICAL
ABERRATION

CHROMATIC
ABERRATION

Fig. 16B
W=16.9°

-0.05   0.05
LATERAL
CHROMATIC
ABERRATION

-1.0   1.0
ASTIGMATISM

Fig. 16D
W=16.9°

-5.0 (%) 5.0
DISTORTION

—— d Line
------ g Line
— — C Line

-1.0   1.0
SPHERICAL
ABERRATION

CHROMATIC
ABERRATION

Fig. 18B
W=15.2°

-0.05   0.05
LATERAL
CHROMATIC
ABERRATION

-1.0   1.0
ASTIGMATISM

Fig. 18D
W=15.2°

-5.0 (%) 5.0
DISTORTION

——— d Line
········ g Line
- - - - C Line

-1.0   1.0
SPHERICAL
ABERRATION

CHROMATIC
ABERRATION

Fig. 20B
W=15.0°

-0.05  0.05
LATERAL
CHROMATIC
ABERRATION

-1.0   1.0
ASTIGMATISM

Fig. 20D
W=15.0°

-5.0 (%) 5.0
DISTORTION

ZOOM LENS SYSTEM

BACKGROUND OF THE INVENTION

1. Field of the Invention

The present invention relates to a zoom lens system for a compact camera.

2. Description of the Related Art

In a zoom lens system, a requirement for a high zoom ratio and a requirement for miniaturization are not compatible. For example, in a zoom lens system of two-lens-group arrangement which can be miniaturized, if lens- group moving paths are designed, i.e. a solution of the lens-group moving path is obtained, with the aim of obtaining a high zoom ratio, lens groups come into contact with each other at the long focal length extremity, or lens groups and the image plane cause interference therebetween at the short focal length extremity. On the other hand, in the case of a zoom lens system of three-lens-group arrangement, the zoom ratio can be made higher than that of a two-lens-group zoom lens system; however, miniaturization of the zoom lens system is difficult. Furthermore, if the optical power (hereinafter, power) of each lens group is determined to obtain an even higher zoom ratio, error sensitivity of each lens group becomes too high, so that a mechanism which can maintain necessary precision on the operations of the lens system under such a high sensitivity is not practical to be obtained.

More concretely, in a two-lens-group zoom lens system, if a zoom ratio is 3.5 or more, the entire zoom lens system has to be made larger since the distance between the lens groups has to be increased. Furthermore, in a two-lens-group zoom lens system, since there are limitations in adequately balancing aberrations at a focal length point in the range defined by the short focal length extremity to the long focal length extremity, a three-lens-group zoom lens system has to be employed. However, a three-lens-group zoom lens system of the prior art is not suitable for achieving a miniaturized zoom lens system, since the overall length thereof and the diameter of the front lens group are large compared with those a two-lens-group zoom lens system.

SUMMARY OF THE INVENTION

It is an object of the present invention to provide a two-lens-group zoom lens system for a compact camera, which has a high zoom ratio, while the overall length and the lens diameters of the zoom lens system are miniaturized.

In order to achieve the above-mentioned object, there is provided a zoom lens system including a positive first lens group and a negative second lens group, in this order from the object. One of the first lens group and the second lens group constitutes a switching lens group. The switching lens group includes at least two sub-lens groups, and one sub-lens group is made moveable, with respect to other sub-lens groups, to either the object-side end or the image-side end.

In a short-focal-length side zooming range from the short focal length extremity to an intermediate switching focal length, the first lens group and the second lens group are moved towards the object- and the distance therebetween is varied, while the moveable sub-lens group in the switching lens group is being made stationary at the object-side end.

At the intermediate switching focal length, the moveable sub-lens group is moved to the image-side end, and the first lens group and the second lens group are moved towards the image plane.

In a long-focal-length side zooming range from the intermediate switching focal length to the long focal length extremity, the first lens group and the second lens group are moved towards the object, and the distance therebetween is varied, while the moveable sub-lens group in the switching lens group is being made stationary at the image-side end.

Furthermore, the zoom lens system preferably satisfies the following condition:

$$0.3 < \log Z_i / \log Z < 0.8 \tag{1}$$

wherein $Z_i = f_m / f_w$;

$Z = f_t / f_w$;

$f_w$ designates the focal length at the short focal length extremity;

$f_t$ designates the focal length at the long focal length extremity; and $f_m$ designates the intermediate switching focal length.

In the case where the first lens group constitutes the switching lens group, the first zoom lens group can include a negative first sub-lens group and a positive second sub-lens group, in this order from the object.

The present disclosure relates to subject matter contained in Japanese Patent Application No. 2000-047619 (filed on Feb. 24, 2000) which is expressly incorporated herein by reference in its entirety.

Copending and commonly assigned U.S. Patent Application to "A Zoom Lens System", listing as an inventor Takashi ENOMOTO, filed concurrently with the present application, having Attorney docket No. P20648 and having Ser. No. 09/791,890 (pending); and Japanese Patent Application No. 2001-015741 (filed on Jan. 24, 2001), from which the application designated by Attorney docket No. P20648 claims priority, are expressly incorporated herein by reference in their entireties.

BRIEF DESCRIPTION OF THE DRAWINGS

The invention will be discussed below in detail with reference to the accompanying drawings, in which.

DESCRIPTION OF THE PREFERRED EMBODIMENTS

Figure 21:
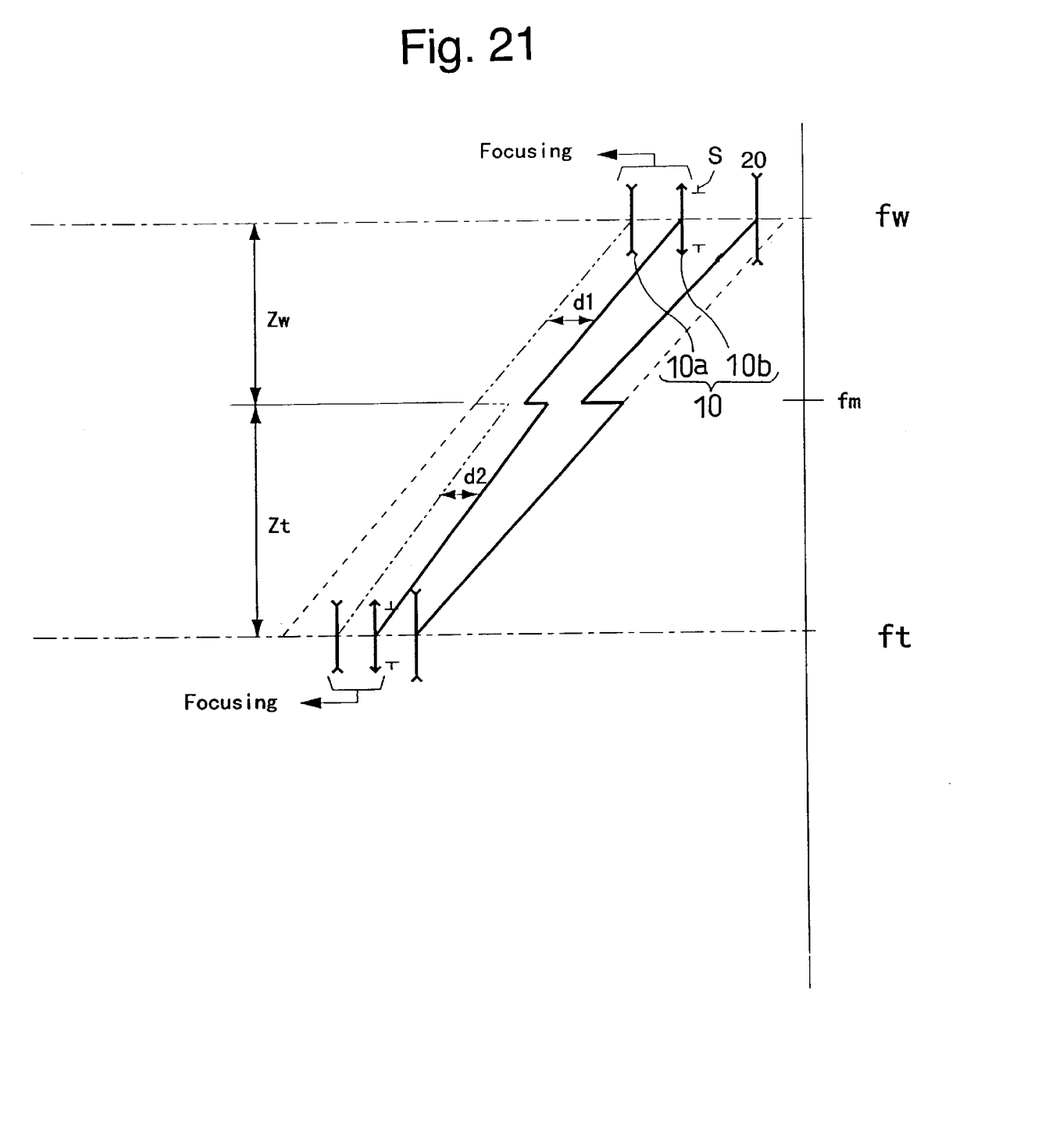
FIG. 21 shows lens-group moving paths for zooming in the zoom lens system according to the present invention.

As shown in the lens-group moving paths of FIG. 21, the zoom lens system includes a positive first lens group 10, and a negative second lens group 20, in this order from the object. The first lens group (switching lens group) 10 includes a first sub-lens group 10a and a second sub-lens group 10b, in this order from the object. Upon zooming from the short focal length extremity fw toward the long focal length extremity ft, the first lens group 10 and the second zoom lens group 20 are arranged to move as follows:

In a short-focal-length side zooming range Zw from the short focal length extremity fw to the intermediate switching focal length fm, the first lens group 10 and the second lens group 20 are moved toward the object, while the distance therebetween is varied.

At the intermediate switching focal length fm, the first lens group 10 and the second lens group 20 are moved towards the image plane by a predetermined distance.

In a long-focal-length side zooming range Zt from the intermediate switching focal length to the long focal length extremity, the first lens group and the second lens group are moved towards the object, while the distance therebetween is varied. Furthermore, the first sub-lens group (moveable sub-lens group) 10a can be alternatively moveable, with respect to the second sub-lens group, to either the object-side end or the image-plane side end. In the short-focal-length side zooming range Zw, the first sub-lens group 10a is made stationary at the object-side end; at the intermediate switching focal length fm, the first sub-lens group 10a is moved to the image-plane side end; and in the long-focal-length side zooming range Zt, the first sub-lens group 10a is made stationary at the image-plane side end. The aperture stop S moves together with the second sub-lens group 10b during zooming.

The lens-group-moving paths shown in FIG. 21 are simply depicted as straight lines. It should however be noted that actual lens-group-moving paths are not necessarily straight lines. Furthermore, focusing is performed by integrally moving the first sub-lens group 10a and the second sub-lens group 10b, i.e., the first lens group 10 regardless of the zooming ranges.

The lens-group-moving paths have discontinuities at the intermediate switching focal length fm; however, by adequately determining the positions of the first sub-lens group 10a, the second sub-lens group 10b and the second lens group 20 respectively at the short focal length extremity fw, the intermediate switching focal length fm and the long focal length extremity ft, solutions by which an image is correctly formed on a predetermined plane can be obtained. According to the lens-group-moving paths with these solutions, a zoom lens system which is miniaturized and has a high zoom ratio can be obtained.

The existence of solutions for the lens-group-moving paths of the first embodiment can be explained, for example, by the following discussions:

The zoom lens system of the first embodiment can be divided into a negative lens group, a positive lens group, and a negative lens group, in this order from the object. Here, the negative and the positive lens groups on the object side (i.e., the first sub-lens group 10a and the second sub-lens group 10b) are considered to be a positive front lens group (the first lens group 10) in which the relative position of the negative and positive lens groups is fixed respectively at the long focal length extremity ft and at the short focal length extremity fw. Since the distance between the first sub-lens group 10a and the second sub-lens group lob is longer at the short focal length extremity fw than at the long focal length extremity ft (d1>d2), the focal length Pt of the first lens group 10 at the long focal length extremity ft is longer than the focal length Pw thereof at the short focal length extremity fw, i.e., Pt>Pw. In other words, the first lens group 10 with the focal length Pt and the second lens group 20 can be considered to be a two-lens-group zoom lens system, and the first lens group 10 with the focal length Pw and the second lens group 20 can be considered to be another two-lens group zoom lens system. Therefore solutions for each zoom lens system can be obtained. More concretely, one of the two solutions is the lens-group-moving paths in the short-focal-length side zooming range Zw, and the other solution is the lens-group-moving paths in the long-focal-length side zooming range Zt. However, at the intermediate switching focal length fm, these paths are discontinued, and the distance between the negative and the positive lens groups in the front lens group is not the same. It should be understood that though the movement of the lens groups upon zooming is substantially the same as that of a two-lens-group zoom lens system, a miniaturized zoom lens system with a high zoom ratio can be obtained by (i) providing the discontinuities along the lens-group-moving paths for the first lens group 10 and the second lens group 20 at the intermediate switching focal length fm, and (ii) by varying the distance between the negative and the positive lens groups in the first lens group 10. The above is discussed for the first embodiment; however, the discussions are also applicable for other embodiments.

It is noted that, because of the aforementioned discontinuities and varying of distances, the switching lens groups of the invention do not necessarily fit within the ordinary meaning of an "N lens group" system (where N is a whole number).

For example, in the case of a lens having a switching lens group and one "conventional" lens group, the present disclosure characterizes, for the purposes of explanation, such a lens both (i) as having three lens groups and (ii) as having a first zooming lens group 10 (with first and second sub-lens groups 10*a* and 10*b*) and a second zooming lens group 20. However, the use of the two different characterizations does not mean that a "switching lens group" according to the invention should be considered to be a conventional "lens group". The use of two different characterizations emphasizes that the switching lens groups disclosed herein are different from ordinary "lens groups".

Accordingly, the claims and disclosure of the present application should be interpreted to be consistent with the meaning of "lens group"; "sub-lens group"; "switching lens group"; and "zooming lens group" as set forth herein where such terms would be inconsistent with the same terms as otherwise employed in the art.

Condition (1) specifies the intermediate switching focal length fm at which the sub-lens group of the switching lens group is moved. By satisfying this condition, aberrations can be suitably corrected in a range where a zoom ratio is high up to about 3.5.

If logZi/logZ exceeds the upper limit of condition (1), optical performance of the zoom lens system from the short focal length extremity fw to the intermediate focal length fm cannot be obtained.

If logZi/logZ exceeds the lower limit of condition (1), optical performance of the zoom lens system from the intermediate switching focal length fm to the long focal length extremity cannot be obtained.

Figure 22:
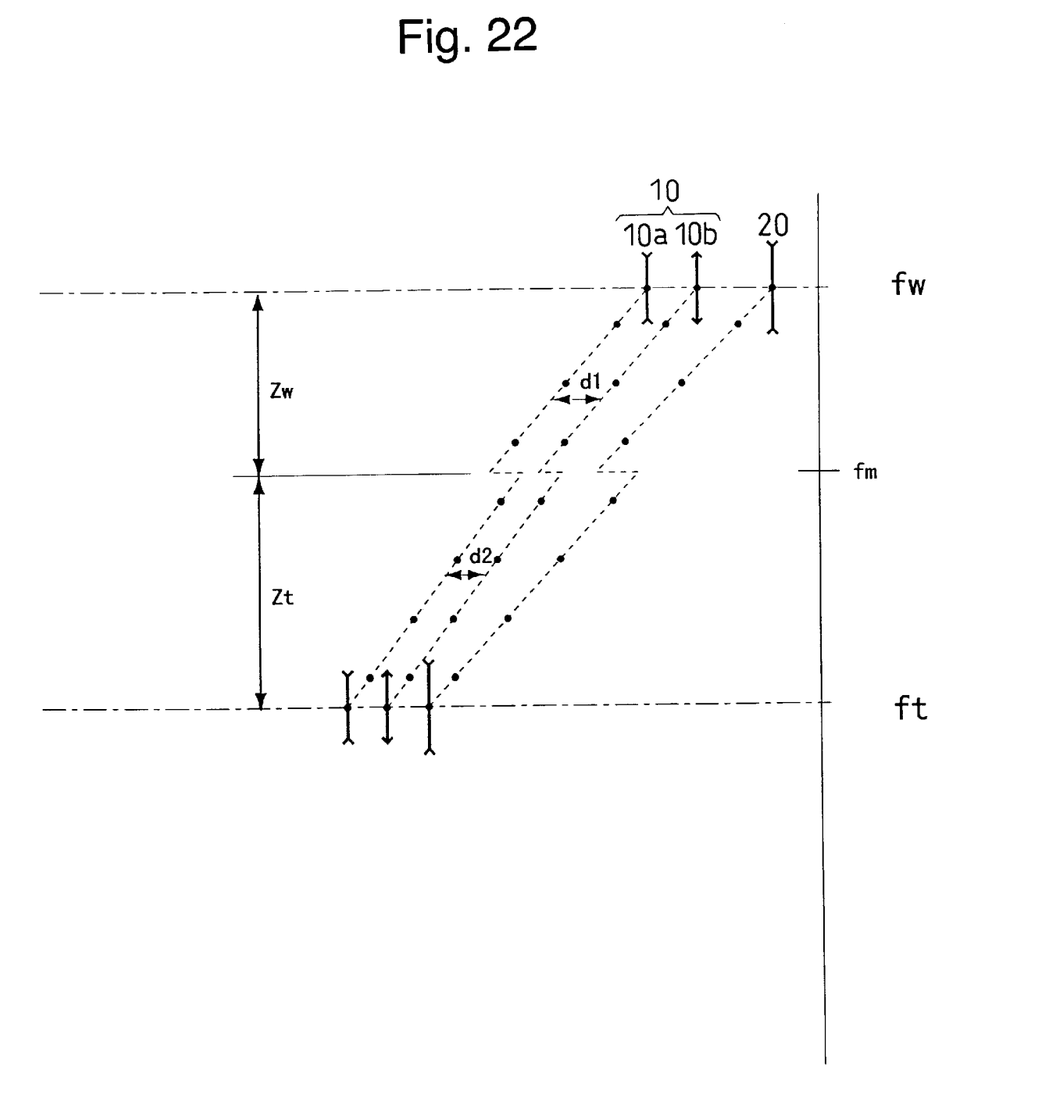
FIG. 22 shows another example lens-group moving paths for zooming in the zoom lens system according to the present invention.
Figure 23:
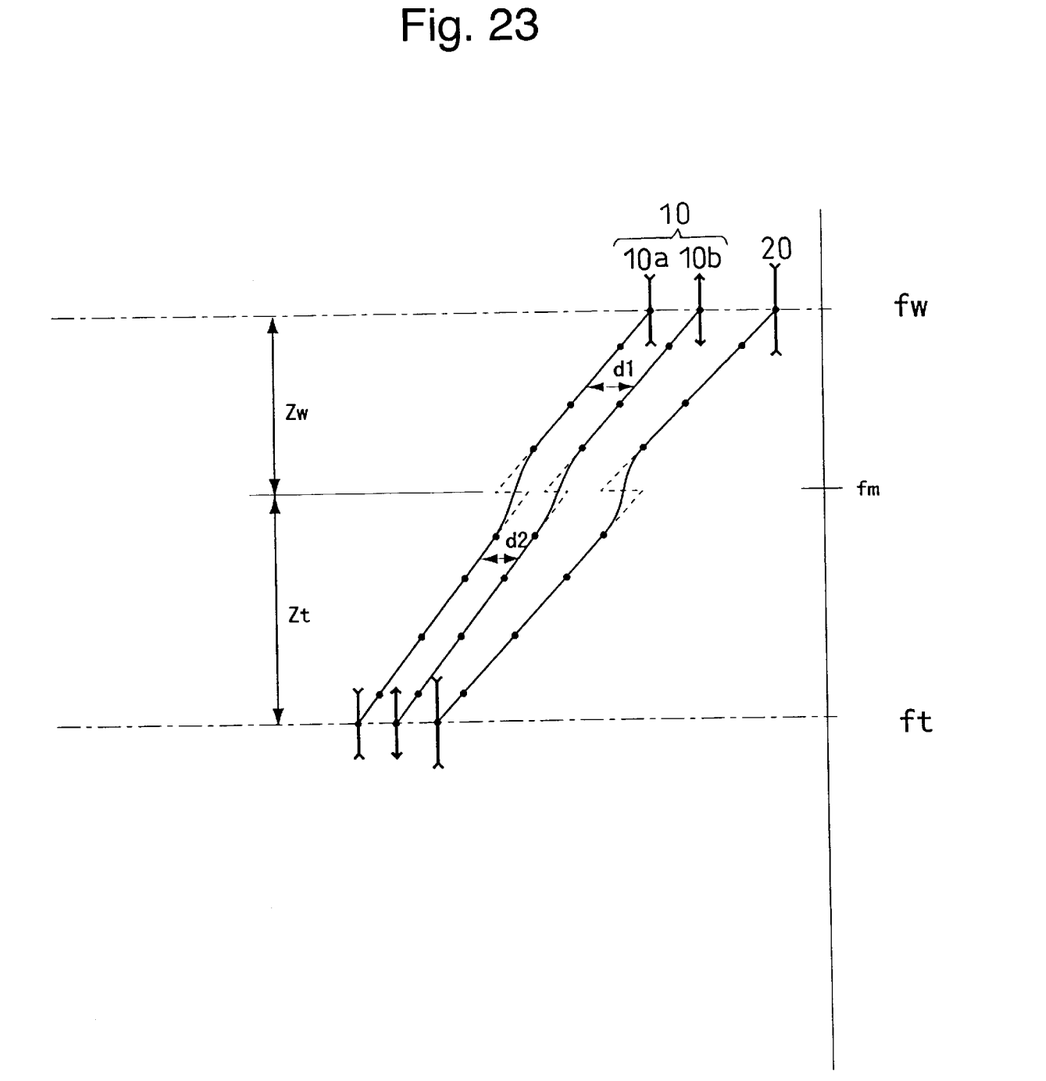
FIG. 23 shows still another example lens-group moving paths for zooming in the zoom lens system according to the present invention.

It is practical to apply the above-described zoom lens system to a photographing lens system of a camera in which the photographing lens system and a finder optical system are independently provided. Moreover, with respect to each lens group, positions at which the lens group stops upon zooming are preferably determined in a stepwise manner along the lens-group-moving path, i.e., it is preferable to provide a plurality of focal-length steps. FIGS. 22 and 23 show that positions for stopping each lens group are determined in a stepwise manner along the lens-group-moving paths. Since these lens systems shown in FIGS. 22 and 23 are the same as that of FIG. 21, the identical components are provided with the same numerals. In FIG. 22, the lens-group-moving paths are depicted with dotted lines; and positions at which each lens group is to be stopped are indicated with black dots along the dotted lines. Further, in FIG. 23, the dots are connected by smooth curved lines. According to an actual mechanical structure, each lens group can be moved along such smooth curved lines.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire zoom lens system, m designates the transverse magnification, W designates the half angle-of-view ( ), fB designates the back focal distance, r designates the radius of curvature, d designates the lens-element thickness or distance between lens elements, Nd designates the refractive index at the d-line, and v designates the Abbe number.

In addition to the above, an a spherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

x designates a distance from a tangent plane of an a spherical vertex;

c designates a curvature of the a spherical vertex (1/r);

y designates a distance from the optical axis;

K designates the conic coefficient; and

A4 designates a fourth-order a spherical coefficient;

A6 designates a sixth-order a spherical coefficient;

A8 designates a eighth-order a spherical coefficient; and

A10 designates a tenth-order a spherical coefficient.

Figure 1:
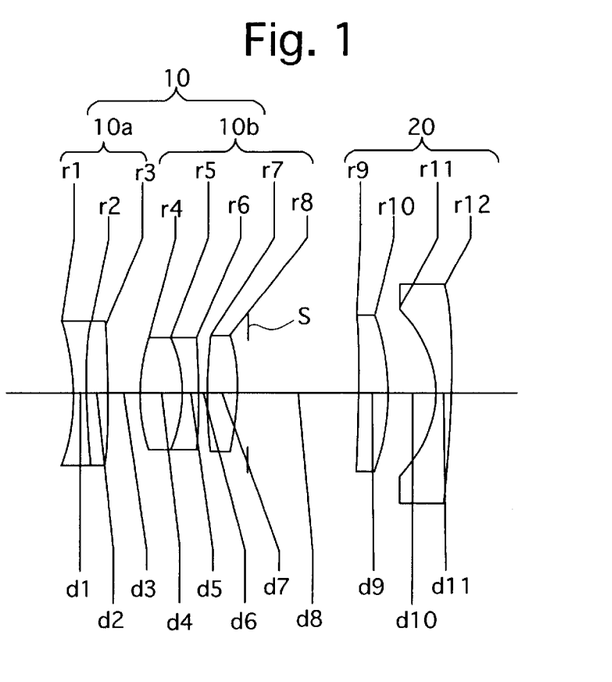
FIG. 1 is a lens arrangement of the zoom lens system at the short focal length extremity, according to first through fourth embodiments of the present invention.
Figures 2A, 2B:
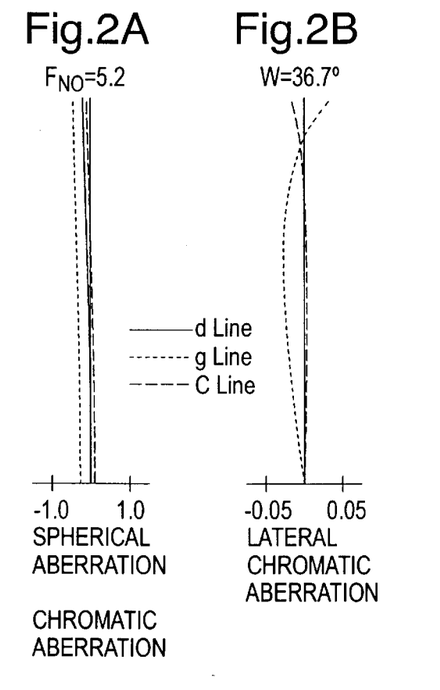
FIGS. 2A, 2B, 2C and 2D show aberrations of the lens arrangement shown in FIG. 1.
Figure 2C:
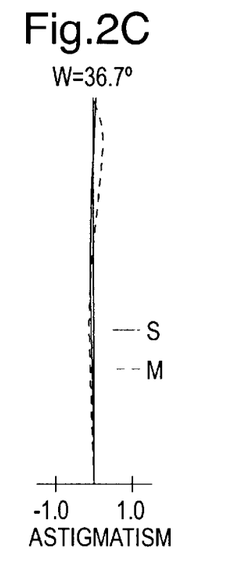
Figure 2D:
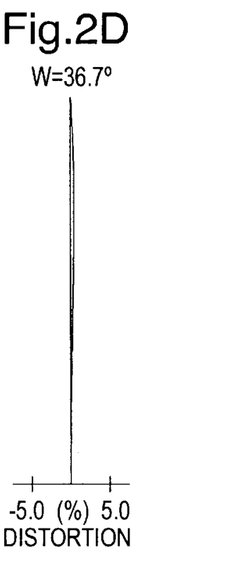
Figure 3:
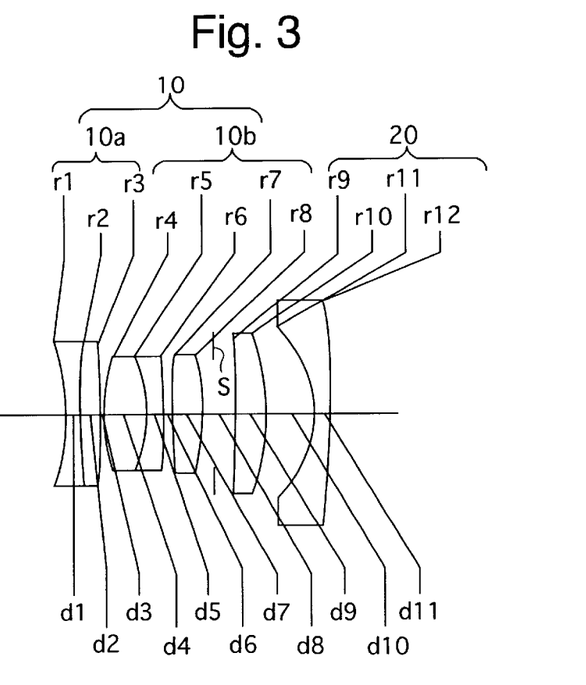
FIG. 3 is a lens arrangement of the zoom lens system at the long focal length extremity, according to the first through fourth embodiments of the present invention.
Figures 4A, 4B:
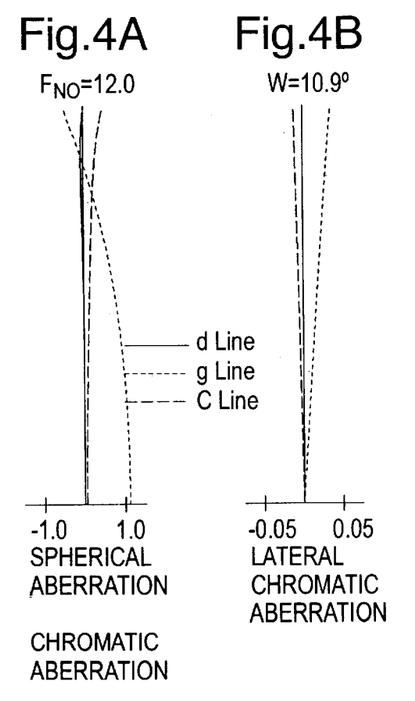
FIGS. 4A, 4B, 4C and 4D show aberrations of the lens arrangement shown in FIG. 3.
Figure 4C:
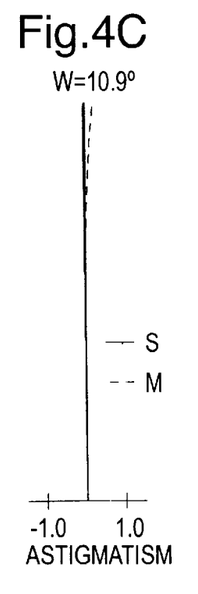
Figure 4D:
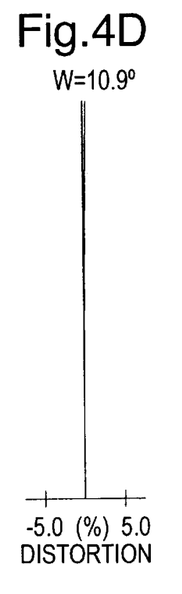

In each of the first through fourth embodiments, the different intermediate switching focal length fm is indicated. Accordingly, the lens arrangement at the short focal length extremity fw and the long focal length extremity ft are the same in the first through fourth embodiments. FIGS. 1 and 3 show the lens arrangements thereof, and FIGS. 2A through 2D, and 4A through 4D show the aberrations thereof.

FIG. 1 is the lens arrangement of the zoom lens system at the short focal length extremity, according to first through fourth embodiments. FIGS. 2A through 2D show aberrations of the lens arrangement shown in FIG. 1. FIG. 3 is the lens arrangement of the zoom lens system at the long focal length extremity, according to the first through fourth embodiments. FIGS. 4A through 4D show aberrations of the lens arrangement shown in FIG. 3. Table 1 shows numerical data of the first through fourth embodiments. Lens surface Nos. 1 through 8 constitute the positive first lens group (switching lens group) 10, lens surface Nos. 9 through 12 constitute the negative second lens group 20. The first lens group 10 includes the first sub-lens group 10*a* constituted by negative-and-positive cemented lens elements; and a second sub-lens group 10*b* constituted by positive-and-negative cemented lens elements, and a positive lens element, in this order from the object. The second lens group 20 includes a positive lens element and a negative lens element, in this order from the object. The aperture stop S is positioned at the distance of 1.0 millimeter from the image-side of surface No. 8.

TABLE 1

$F_{NO} = 1:5.2–12.0$
f = 29.00–112.00 (zoom ratio: 3.86)
W = 36.7–10.9
$f_B$ = 8.45–76.08

| Surface No. | r | d | $N_d$ | $\nu$ |
|---|---|---|---|---|
| 1 | −19.417 | 1.20 | 1.74330 | 49.3 |
| 2 | 48.529 | 1.90 | 1.65917 | 32.3 |
| 3* | −97.703 | 3.05–0.25 | — | — |
| 4 | 15.956 | 4.06 | 1.48749 | 70.2 |
| 5 | −10.901 | 1.50 | 1.84204 | 32.3 |
| 6 | −52.374 | 0.88 | — | — |
| 7 | 52.891 | 2.83 | 1.73077 | 40.5 |
| 8* | −18.318 | 11.39–3.01 | — | — |
| 9* | −50.943 | 2.69 | 1.58547 | 29.9 |
| 10 | −21.717 | 4.55 | — | — |
| 11 | −10.024 | 1.40 | 1.80238 | 45.9 |
| 12 | −87.799 | — | — | — |

*designates the aspherical surface which is rotationally symmetrical with respect to the optical axis.

Aspherical surface data (the aspherical surface coefficients not indicated are zero(0.00)):

| Surf. No. | K | A4 | A6 | A8 |
|---|---|---|---|---|
| 3 | 0.00 | $0.3653 \times 10^{-5}$ | $-0.1700 \times 10^{-6}$ | — |
| 8 | 0.00 | $0.6172 \times 10^{-4}$ | $0.8952 \times 10^{-8}$ | $0.8233 \times 10^{-9}$ |
| 9 | 0.00 | $0.5891 \times 10^{-4}$ | $-0.1232 \times 10^{-6}$ | $0.6298 \times 10^{-8}$ |

EMBODIMENT 1

Figure 5:
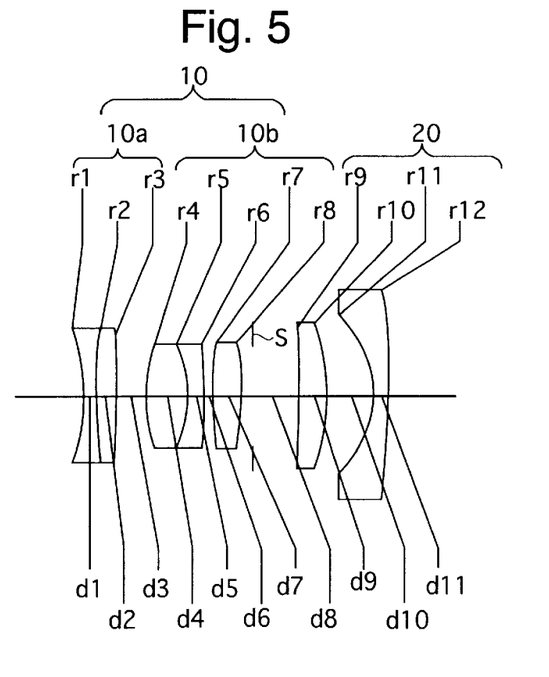
FIG. 5 is a lens arrangement of the zoom lens system at the intermediate switching focal length fm under the condition that the moveable sub-lens group of the first embodiment is made stationary at the object-side end.
Figures 6A, 6B:
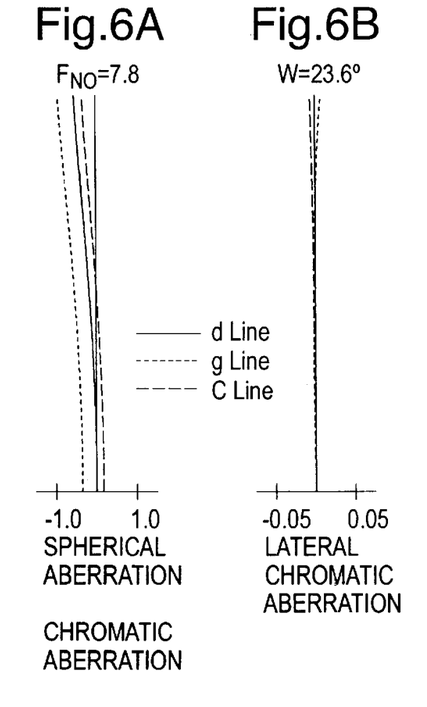
FIGS. 6A, 6B, 6C and 6D show aberrations of the lens arrangement shown in FIG. 5.
Figure 6C:
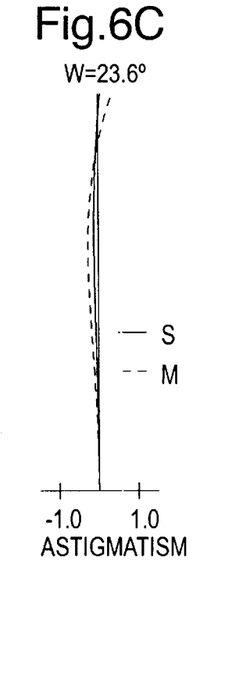
Figure 6D:
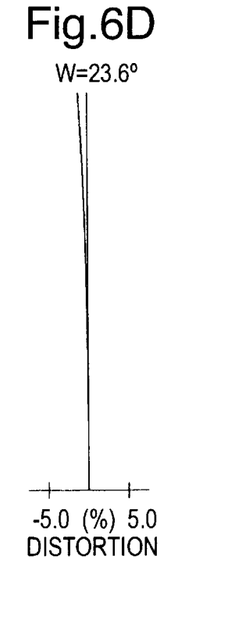
Figure 7:
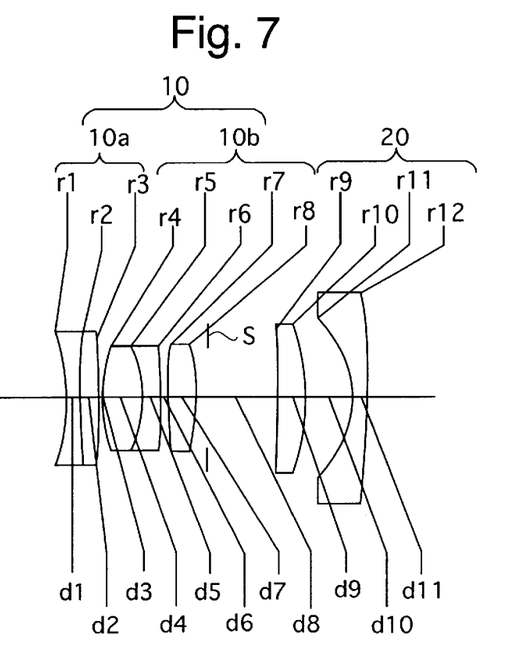
FIG. 7 is a lens arrangement of the zoom lens system at the intermediate switching focal length fm under the condition that the moveable sub-lens group of the first embodiment is made stationary at the image-plane side end.
Figures 8A, 8B:
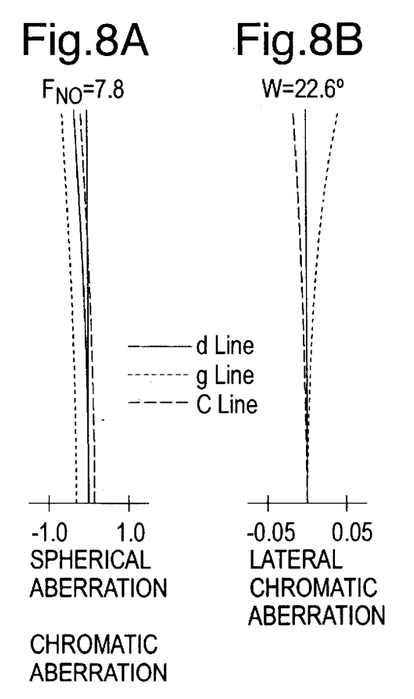
FIGS. 8A, 8B, 8C and 8D show aberrations of the lens arrangement shown in FIG. 7.
Figure 8C:
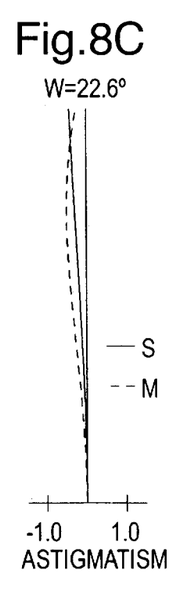
Figure 8D:
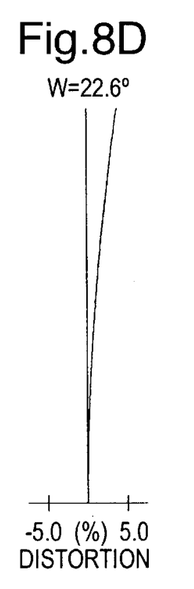

FIGS. 5 through 8 show the first embodiment in which the intermediate switching focal length fm is 50.00 mm. FIG. 5 is the lens arrangement of the zoom lens system at the intermediate switching focal length fm under the condition that the moveable sub-lens is made stationary at the object-side end. FIGS. 6A through 6D show aberrations of the lens arrangement shown in FIG. 5. FIG. 7 is the lens arrangement of the zoom lens system at the intermediate switching focal length fm under the condition that the moveable sub-lens group is made stationary at the image-plane side end. FIGS. 8A through 8D show aberrations of the lens arrangement shown in FIG. 7. Table 2 shows the numerical data of the first embodiment.

TABLE 2 fm(Zw) = 50.00 ($F_{NO}$ = 7.8; W = 23.6; $f_B$ = 28.75; D3 = 3.05; D8 = 5.56)
fm(Zt) = 50.00 ($F_{NO}$ = 7.8; W = 22.6; $f_B$ = 23.12; D3 = 0.25; D8 = 8.04)

EMBODIMENT 2

Figure 9:
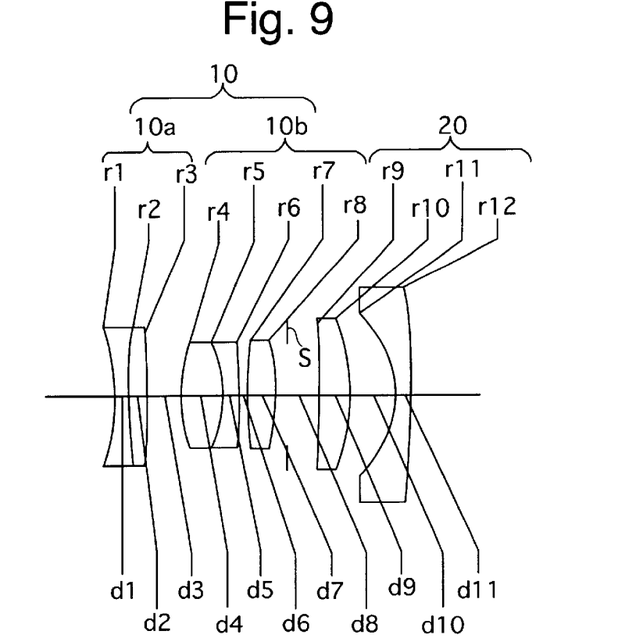
FIG. 9 is a lens arrangement of the zoom lens system at the intermediate switching focal length fm under the condition that the moveable sub-lens group of the second embodiment is made stationary at the object-side end.
Figures 10A, 10B:
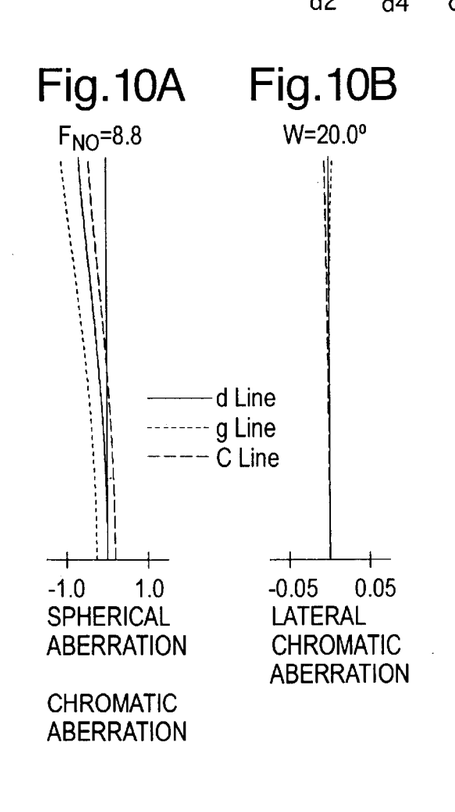
FIGS. 10A, 10B, 10C and 10D show aberrations of the lens arrangement shown in FIG. 9.
Figure 10C:
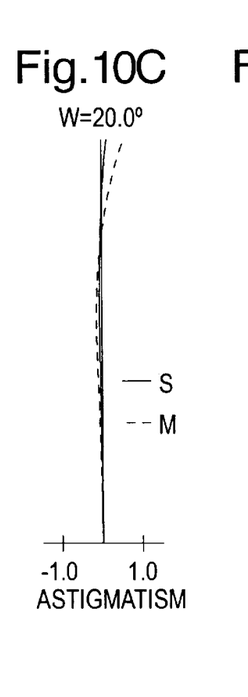
Figure 10D:
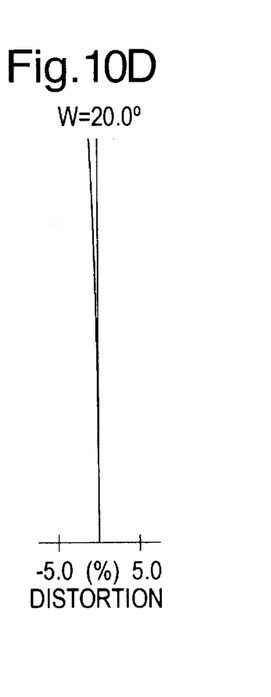
Figure 11:
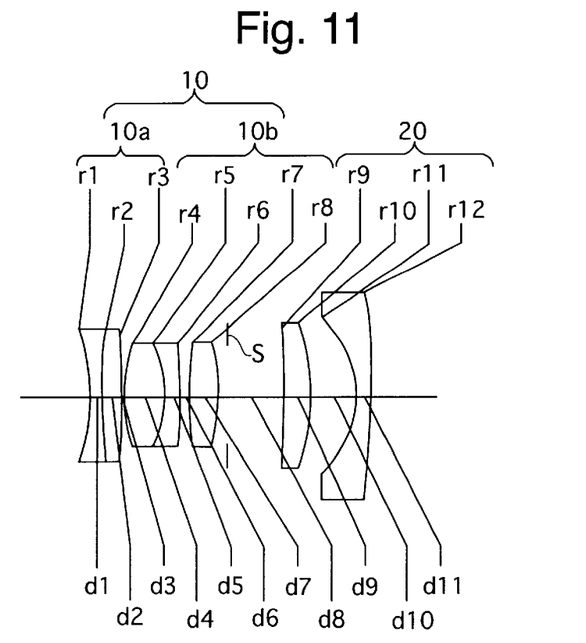
FIG. 11 is a lens arrangement of the zoom lens system at the intermediate switching focal length fm under the condition that the moveable sub-lens group of the second embodiment is made stationary at the image-plane side end.
Figures 12A, 12B:
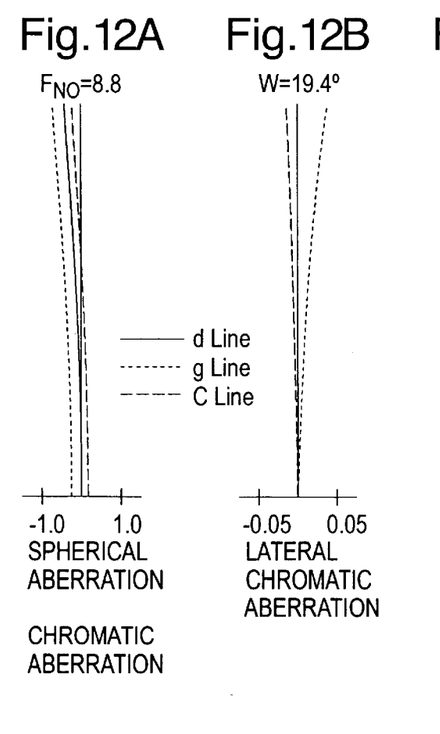
FIGS. 12A, 12B, 12C and 12D show aberrations of the lens arrangement shown in FIG. 11.
Figure 12C:
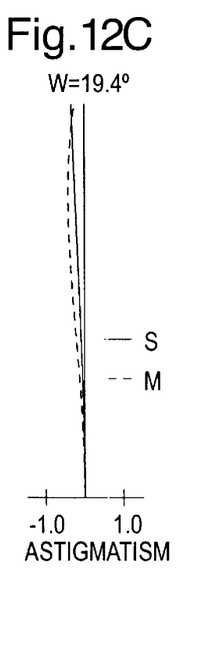
Figure 12D:
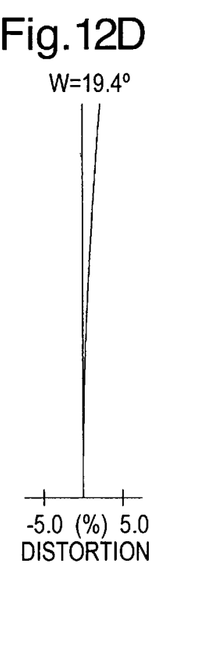

FIGS. 9 through 12 show the second embodiment in which the intermediate switching focal length fm is 60.00 mm. FIG. 9 is the lens arrangement of the zoom lens system at the intermediate switching focal length fm under the condition that the moveable sub-lens is made stationary at the object-side end. FIGS. 10A through 10D show aberrations of the lens arrangement shown in FIG. 9. FIG. 11 is the lens arrangement of the zoom lens system at the intermediate switching focal length fm under the condition that the moveable sub-lens group is made stationary at the image-plane side end. FIGS. 12A through 12D show aberrations of the lens arrangement shown in FIG. 11. Table 3 shows the numerical data of the second embodiment.

TABLE 3 fm(Zw) = 60.00 ($F_{NO}$ = 8.8; W = 20.0; $f_B$ = 38.42; D3 = 3.05; D8 = 4.22)
fm(Zt) = 60.00 ($F_{NO}$ = 8.8; W = 19.4; $f_B$ = 31.66; D3 = 0.25; D8 = 6.53)

EMBODIMENT 3

Figure 13:
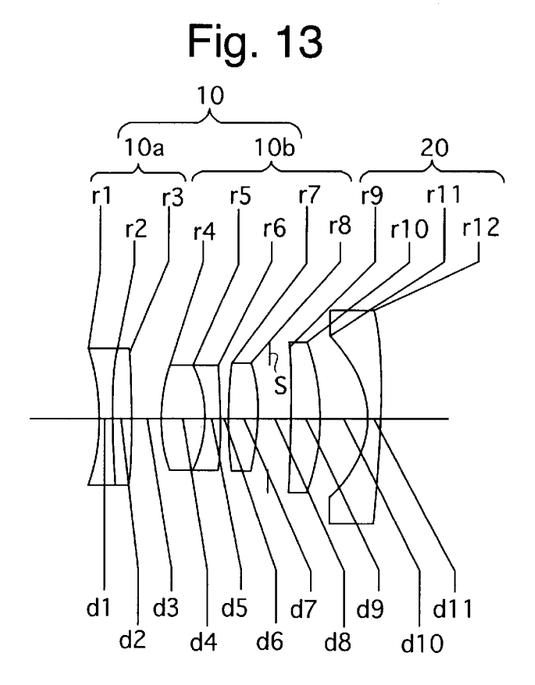
FIG. 13 is a lens arrangement of the zoom lens system at the intermediate switching focal length fm under the condition that the moveable sub-lens group of the third embodiment is made stationary at the object-side end.
Figures 14A, 14B:
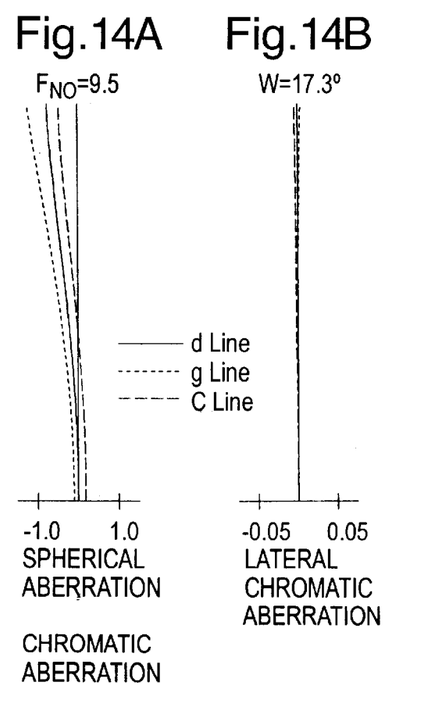
FIGS. 14A, 14B, 14C and 14D show aberrations of the lens arrangement shown in FIG. 13.
Figure 14C:
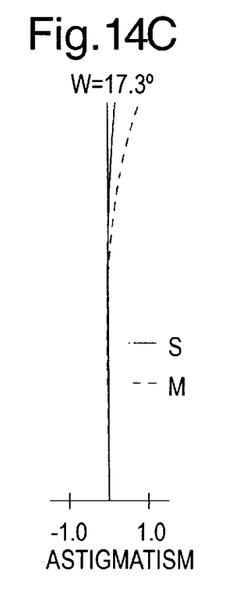
Figure 14D:
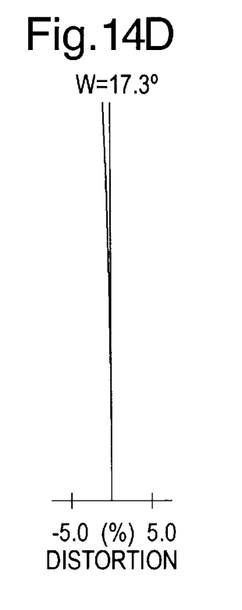
Figure 15:
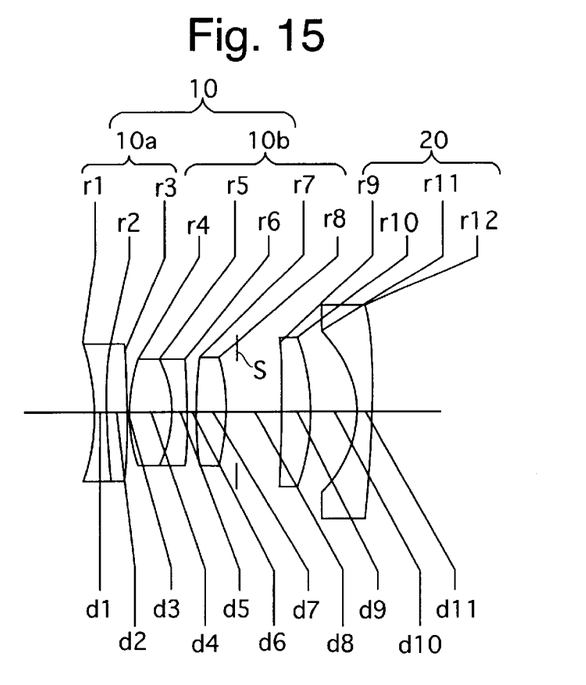
FIG. 15 is a lens arrangement of the zoom lens system at the intermediate switching focal length fm under the condition that the moveable sub-lens group of the third embodiment is made stationary at the image-plane side end.
Figures 16A, 16B:
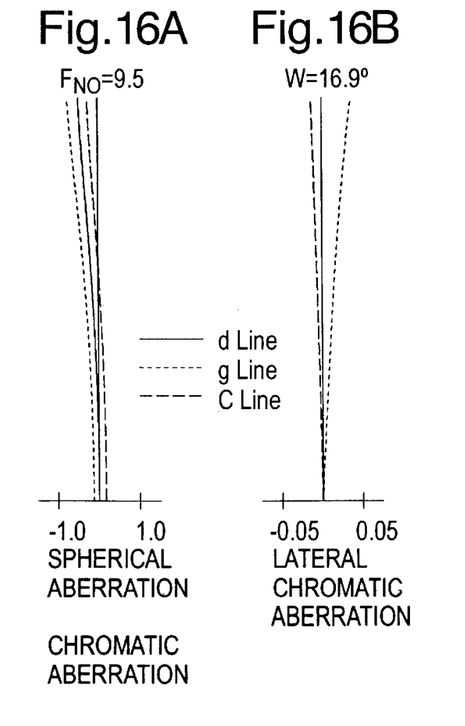
FIGS. 16A, 16B, 16C and 16D show aberrations of the lens arrangement shown in FIG. 15.
Figure 16C:
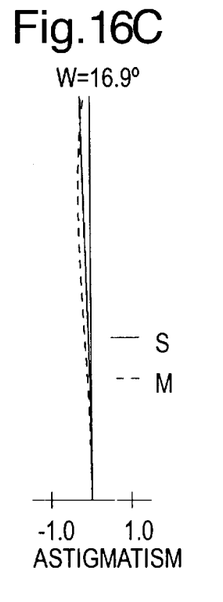
Figure 16D:
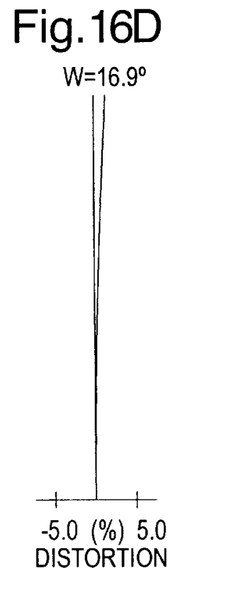

FIGS. 13 through 16 show the third embodiment in which the intermediate switching focal length fm is 70.00 mm. FIG. 13 is the lens arrangement of the zoom lens system at the intermediate switching focal length fm under the condition that the moveable sub-lens is made stationary at the object-side end. FIGS. 14A through 14D show aberrations of the lens arrangement shown in FIG. 13. FIG. 15 is the lens arrangement of the zoom lens system at the intermediate switching focal length fm under the condition that the moveable sub-lens group is made stationary at the image-plane side end. FIGS. 16A through 16D show aberrations of the lens arrangement shown in FIG. 15. Table 4 shows the numerical data the third embodiment.

TABLE 4 fm(Zw) = 70.00 ($F_{NO}$ = 9.5; W = 17.3; $f_B$ = 48.08; D3 = 3.05; D8 = 3.27)
fm(Zt) = 70.00 ($F_{NO}$ = 9.5; W = 16.9; $f_B$ = 40.21; D3 = 0.25; D8 = 5.44)

EMBODIMENT 4

Figure 17:
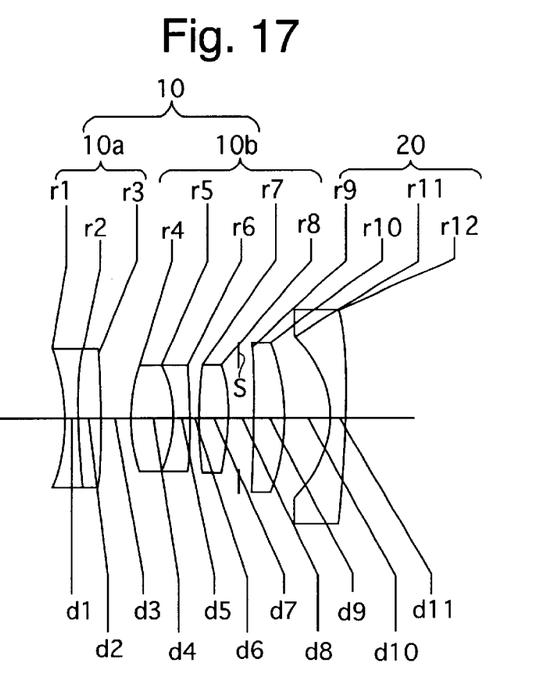
FIG. 17 is a lens arrangement of the zoom lens system at the intermediate switching focal length fm under the condition that the moveable sub-lens group of the fourth embodiment is made stationary at the object-side end.
Figures 18A, 18B:
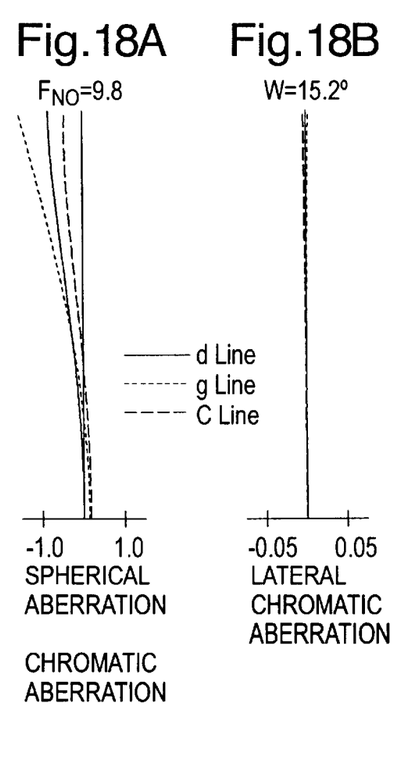
FIGS. 18A, 18B, 18C and 18D show aberrations of the lens arrangement shown in FIG. 17.
Figure 18C:
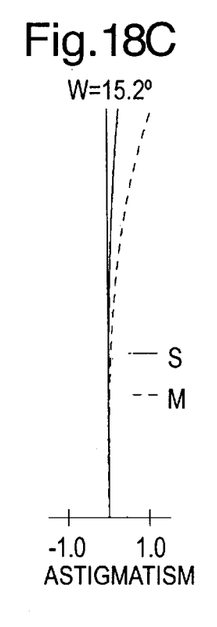
Figure 18D:
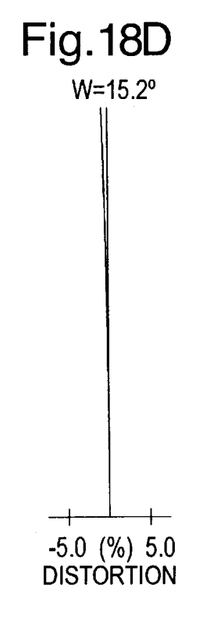
Figure 19:
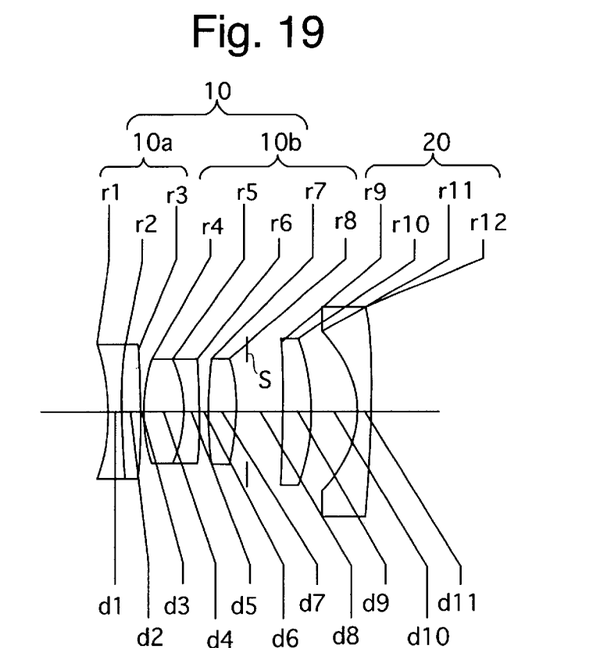
FIG. 19 is a lens arrangement of the zoom lens system at the intermediate switching focal length fm under the condition that the moveable sub-lens group of the fourth embodiment is made stationary at the image-plane side end.
Figures 20A, 20B:
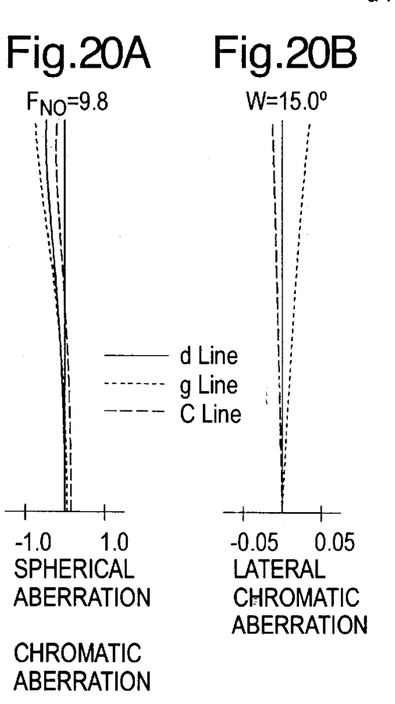
FIGS. 20A, 20B, 20C and 20D show aberrations of the lens arrangement shown in FIG. 19.
Figure 20C:
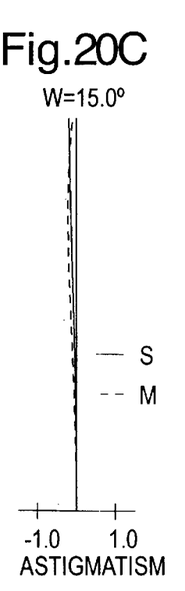
Figure 20D:
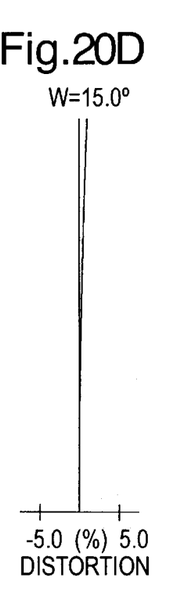

FIGS. 17 through 20D show the fourth embodiment in which the intermediate switching focal length is 80.00 mm. FIG. 17 is the lens arrangement of the zoom lens system at the intermediate switching focal length fm under the condition that the moveable sub-lens group is made stationary at the object-side end. FIGS. 18A through 18D show aberrations of the lens arrangement shown in FIG. 17. FIG. 19 is the lens arrangement of the zoom lens system at the intermediate switching focal length fm under the condition that the moveable sub-lens group is made stationary at the image-plane side end. FIGS. 20A through 20D show aberrations of the lens arrangement shown in FIG. 19. Table 5 shows the numerical data of the fourth embodiment.

TABLE 5 fm(Zw) = 80.00 ($F_{NO}$ = 9.8; W = 15.2; $f_B$ = 57.75; D3 = 3.05; D8 = 2.55)
fm(Zt) = 80.00 ($F_{NO}$ = 9.8; W = 15.0; $f_B$ = 48.75; D3 = 0.25; D8 = 4.63)

Table 6 shows the numerical values of condition (1) of each embodiment.

TABLE 6

| | Embod.1 | Embod.2 | Embod.3 | Embod.4 |
|---|---|---|---|---|
| Cond. (1) | 0.40 | 0.54 | 0.65 | 0.75 |

As can be understood by Table 6, each embodiment satisfies condition (1), and as can be understood from the drawings, various aberrations at each focal length have been adequately corrected.

In the first through fourth embodiments, the first lens group constitutes the switching lens group; however, the second lens group can alternatively be the switching lens group.

According to the above description, a two-lens-group zoom lens system for a compact camera, which has a high zoom ratio, and the miniaturized overall length and lens diameters, can be obtained.

What is claimed is:

1. A zoom lens system comprising a positive first lens group and a negative second lens group, in this order from an object, wherein one of said first lens group and said second lens group comprises a switching lens group, and said switching lens group comprises at least two sub-lens groups;

wherein one sub-lens group is made moveable, with respect to other sub-lens groups, to either the object-side end or the image-side end;

wherein in a short-focal-length side zooming range from the short focal length extremity to an intermediate switching focal length, said first lens group and said second lens group are moved towards said object, and the distance therebetween is varied, while said moveable sub-lens group in said switching lens group is being made stationary at the object-side end;

wherein at said intermediate switching focal length, said moveable sub-lens group is moved to the image-side end, and said first lens group and said second lens group are moved towards the image plane;

wherein in a long-focal-length side zooming range from said intermediate switching focal length to the long focal length extremity, said first lens group and said second lens group are moved towards said object, and the distance therebetween is varied, while said moveable sub-lens group in said switching lens group is being made stationary at the image-side end; and wherein said zoom lens system satisfies the following condition:

$$0.3 < \log Z_i / \log Z < 0.8$$

wherein $Z_i = f_m / f_w$;

$Z = f_t / f_w$;

$f_w$ designates the focal length at the short focal length extremity;

$f_t$ designates the focal length at the long focal length extremity; and $f_m$ designates said intermediate switching focal length.

2. The zoom lens system according to claim 1, wherein said first lens group comprises said switching lens group, and said first lens group comprises a negative first sub-lens group and a positive second sub-lens group, in this order from said object.

* * * * *